(12) United States Patent
Sasaki

(10) Patent No.: US 10,896,677 B2
(45) Date of Patent: Jan. 19, 2021

(54) VOICE INTERACTION SYSTEM THAT GENERATES INTERJECTION WORDS

(71) Applicant: TOYOTA JIDOSHA KABUSHIKI KAISHA, Toyota (JP)

(72) Inventor: Satoru Sasaki, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/179,012

(22) Filed: Nov. 2, 2018

(65) Prior Publication Data

US 2019/0147872 A1 May 16, 2019

(30) Foreign Application Priority Data

Nov. 15, 2017 (JP) ................................. 2017-220157

(51) Int. Cl.
*G10L 15/22* (2006.01)
*G10L 15/08* (2006.01)
*G10L 15/30* (2013.01)

(52) U.S. Cl.
CPC ............. *G10L 15/22* (2013.01); *G10L 15/08* (2013.01); *G10L 15/30* (2013.01); *G10L 2015/088* (2013.01); *G10L 2015/227* (2013.01)

(58) Field of Classification Search
CPC ....................................................... G10L 15/22
See application file for complete search history.

(56) References Cited

U.S. PATENT DOCUMENTS

| 2009/0204410 A1* | 8/2009 | Mozer | ..................... G10L 15/30 704/275 |
| 2015/0206531 A1 | 7/2015 | Fujisawa et al. | |
| 2018/0130462 A1* | 5/2018 | Kayama | .................. G10L 13/02 |

FOREIGN PATENT DOCUMENTS

JP 2015-135420 A 7/2015

\* cited by examiner

*Primary Examiner* — Jianlong He
(74) *Attorney, Agent, or Firm* — Oliff PLC

(57) ABSTRACT

An information processing device includes a processor configured to acquire voice data of a voice uttered by a user, recognize the acquired voice, determine a timing of an interjection in accordance with time from completion of the voice data acquisition to start of output of a response generated based on a result of the voice recognition, output the interjection at the determined timing of the interjection, and output the response at the time of start of the output of the response.

6 Claims, 4 Drawing Sheets

VOICE INTERACTION SYSTEM THAT GENERATES INTERJECTION WORDS

INCORPORATION BY REFERENCE

The disclosure of Japanese Patent Application No. 2017-220157 filed on Nov. 15, 2017 including the specification, drawings and abstract is incorporated herein by reference in its entirety.

BACKGROUND

1. Technical Field

The disclosure relates to an information processing device outputting a response with respect to utterance by a user.

2. Description of Related Art

A voice recognition terminal device is known in the related art (see, for example, Japanese Unexamined Patent Application Publication No. 2015-135420 (JP 2015-135420 A)). The voice recognition terminal device utters, with respect to a user, a bridge word having a time length corresponding to a predicted response delay time during waiting time from voice utterance by the user to response message obtainment from a remote server recognizing the voice utterance.

SUMMARY

The above technique does not take into account the server requiring more time for response message creation as the complexity of the utterance by the user increases. Accordingly, depending on the content of the utterance by the user, the bridge word-to-response message waiting time may become excessively long, which may lead to discomfort on the user's part.

The disclosure provides an information processing device with which user discomfort attributable to an excessively long interjection-to-response time can be suppressed.

A first aspect of the disclosure relates to an information processing device including a processor. The processor is configured to acquire voice data of a voice uttered by a user, recognize the acquired voice, determine a timing of an interjection in accordance with time from completion of the voice data acquisition to start of output of a response generated based on a result of the voice recognition, output the interjection at the determined timing of the interjection, and output the response at the time of start of the output of the response.

According to the first aspect described above, the interjection timing is determined in accordance with the length of time from the voice data acquisition completion to the start of the output of the response, and thus the interjection can be delayed and the length of time from the interjection to the response can be shortened in a case where the response generation takes time. Accordingly, the user's discomfort attributable to an excessively long interjection-to-response time can be suppressed.

In the information processing device according to the first aspect described above, the processor may determine the time required from the completion of the voice data acquisition to the start of the output of the response based on a data size of the voice data or a data size of the voice recognition result.

In the information processing device according to the first aspect described above, the processor may determine the timing of the interjection such that time from the acquisition of the voice data to the output of the interjection is shorter than time from the output of the interjection to the output of the response.

In the information processing device according to the first aspect described above, the processor may delay the timing of the interjection as the data size of the voice data or the data size of the voice recognition result increases.

A second aspect of the disclosure relates to an information processing device including a processor. The processor is configured to acquire voice data of a voice uttered by a user, recognize the acquired voice, transmit a result of the voice recognition to a server device creating a response with respect to the voice based on the voice recognition result, acquire the response from the server device, determine a timing of an interjection in accordance with time from completion of the voice data acquisition to start of output of the response in a case where the voice recognition result is transmitted to the server device, and output the response at the start time of the output of the response after outputting the interjection at the determined timing of the interjection.

According to the first and second aspects described above, user discomfort attributable to an excessively long interjection-to-response time can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
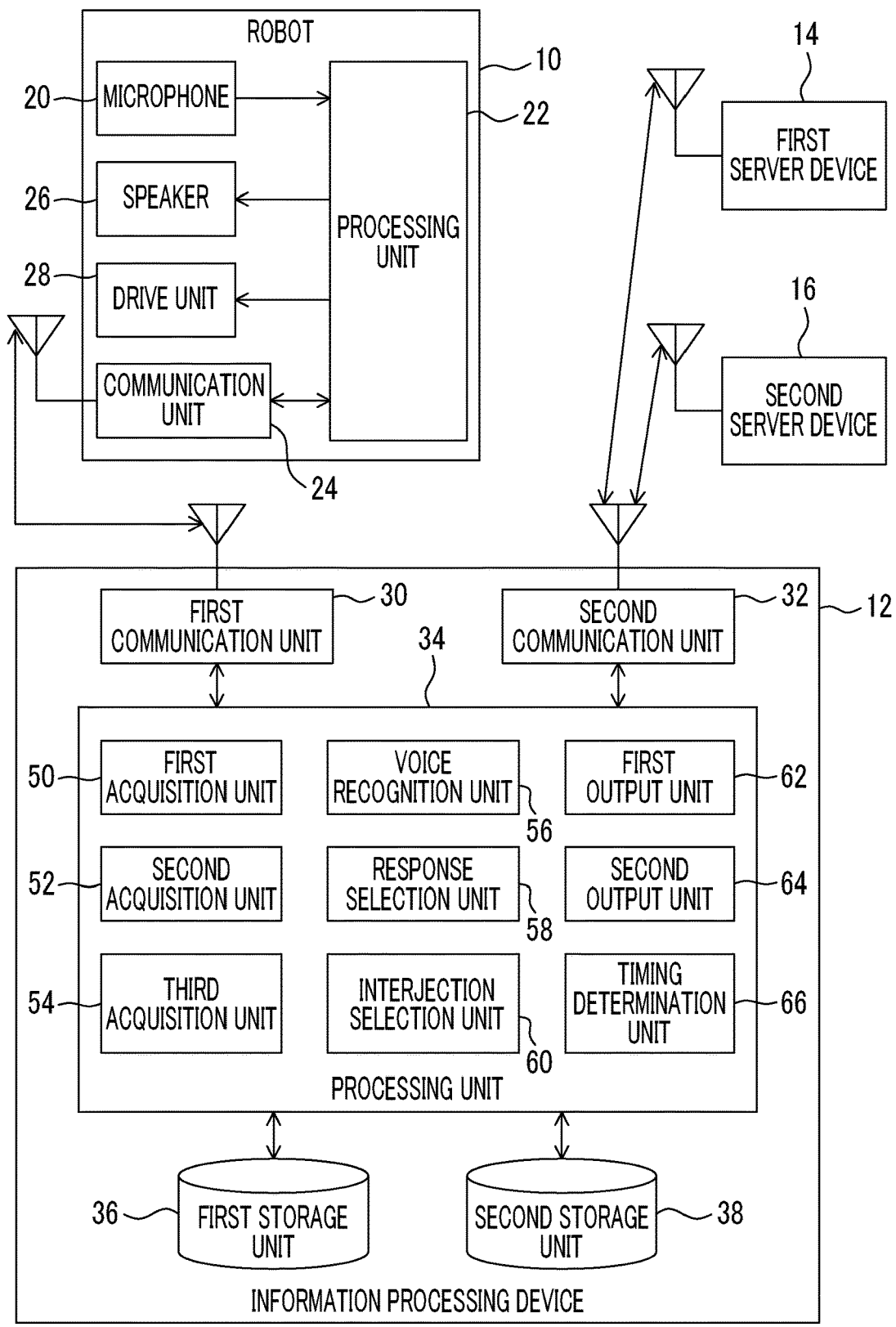
FIG. 1 is a block diagram illustrating the configuration of an information processing system according to an embodiment.

FIG. 1 is a block diagram illustrating the configuration of an information processing system 1 according to an embodiment. The information processing system 1 functions as a dialogue system performing a dialogue with a user. The information processing system 1 is provided with a robot 10, an information processing device 12, a first server device 14, and a second server device 16.

The robot 10 is, for example, a portable small robot. The robot 10 functions as a voice input-output device. A user's voice is input to the robot 10 and the robot 10 outputs the voice of a response with respect to the voice to the user. The robot 10 is provided with a microphone 20, a processing unit 22, a communication unit 24, a speaker 26, and a drive unit 28.

The microphone 20 acquires a voice uttered by a user and outputs the voice data of the voice to the processing unit 22.

The processing unit 22 processes the voice data output from the microphone 20 and outputs the processed voice data to the communication unit 24.

The communication unit 24 performs wireless communication with the information processing device 12. The standard of the wireless communication is not particularly limited yet includes short-range wireless communication technology such as the Bluetooth (registered trademark) and the Bluetooth Low Energy. The communication unit 24 may perform wired communication with the information processing device 12 as well.

The communication unit 24 transmits the voice data output from the processing unit 22 to the information processing device 12. As described later, the communication unit 24 receives an interjection with respect to a voice uttered by a user and a response with respect to the voice from the information processing device 12. Text data or the like constitutes the interjection and the response. The communication unit 24 outputs the received interjection and response to the processing unit 22.

The processing unit 22 converts the interjection and the response output from the communication unit 24 into voice data and outputs the voice data resulting from the conversion to the speaker 26. The processing unit 22 generates a drive signal based on the interjection and the response received by the communication unit 24 and outputs the generated drive signal to the drive unit 28.

The speaker 26 voice-outputs an interjection and a response based on the voice data output from the processing unit 22. The drive unit 28 drives each part (not illustrated) of the robot 10, such as its head and arm, based on the drive signal output from the processing unit 22. For example, the drive signal may be generated such that the robot 10 nods by the drive unit 28 driving the head when the speaker 26 outputs the interjection.

The information processing device 12 is provided with a first communication unit 30, a second communication unit 32, a processing unit 34, a first storage unit 36, and a second storage unit 38. The processing unit 34 is provided with a first acquisition unit 50, a second acquisition unit 52, a third acquisition unit 54, a voice recognition unit 56, a response selection unit 58, an interjection selection unit 60, a first output unit 62, a second output unit 64, and a timing determination unit 66. The information processing device 12 is included in a smartphone, a laptop personal computer, a desktop personal computer, or the like.

The first communication unit 30 performs wireless communication with the communication unit 24 of the robot 10. The first communication unit 30 receives the voice data of a voice uttered by a user from the communication unit 24 of the robot 10.

The first acquisition unit 50 acquires the voice data received by the first communication unit 30. The first acquisition unit 50 outputs the acquired voice data to the voice recognition unit 56 and the second communication unit 32.

The voice recognition unit 56 recognizes a voice uttered by a user based on the voice data output from the first acquisition unit 50 and outputs the result of the voice recognition to the response selection unit 58. Text data or the like constitutes the voice recognition result. Known technology can be used for the voice recognition.

The second communication unit 32 performs wireless communication with the first server device 14 and the second server device 16. The standard of the wireless communication by the second communication unit 32 is not particularly limited yet includes, for example, the third generation mobile communication system (3G), the fourth generation mobile communication system (4G), or the fifth generation mobile communication system (5G). The second communication unit 32 may perform wireless communication with the first server device 14 and the second server device 16 via a base station (not illustrated) as well. The second communication unit 32 transmits the voice data output from the first acquisition unit 50 to the first server device 14.

The first server device 14 receives the voice data transmitted from the second communication unit 32. The first server device 14 recognizes a voice uttered by a user based on the received voice data and transmits the result of the voice recognition to the information processing device 12. As described above, the first server device 14 functions as a voice recognition device.

The accuracy of the voice recognition by the first server device 14 is higher than the accuracy of the voice recognition by the voice recognition unit 56 of the information processing device 12. Accordingly, in some cases, the voice recognition by the first server device 14 can be accurate even when the voice recognition by the voice recognition unit 56 cannot be accurate due to, for example, the effect of the noise included in a voice.

The second communication unit 32 receives a voice recognition result from the first server device 14. The third acquisition unit 54 acquires the voice recognition result received by the second communication unit 32 and outputs the voice recognition result to the response selection unit 58.

Stored in advance in the first storage unit 36 are a plurality of basic responses such as "Good morning" and "Good afternoon". At least one keyword is associated with each response. For example, a keyword such as "Good afternoon" and "Hello" is associated with the "Good afternoon" response. In other words, the first storage unit 36 stores a response with respect to a keyword assumed in advance.

The response selection unit 58 selects a response with respect to a voice uttered by a user among the responses stored in the first storage unit 36 based on the result of the voice recognition by the voice recognition unit 56. The response selection unit 58 outputs the selected response to the second output unit 64. Specifically, in a case where the voice recognition result corresponds to the keyword of the first storage unit 36, the response selection unit 58 selects the response associated with the corresponding keyword among the responses stored in the first storage unit 36. As a result, a response can be determined at a high speed with respect to a voice recognition result assumed in advance. The response selection unit 58 selects no response in a case where the voice recognition result does not correspond to the keyword of the first storage unit 36. For example, a complex voice recognition result such as "I ate ramen today" does not correspond to the keyword of the first storage unit 36, and thus no response is selected in the above case.

In a case where no response can be selected based on the result of the voice recognition by the voice recognition unit 56, the response selection unit 58 selects a response with respect to a voice uttered by a user based on the voice recognition result of the first server device 14. This selection is performed similarly to the selection based on the result of the voice recognition by the voice recognition unit 56 described above. As a result, in a case where the first server device 14 is capable of performing voice recognition with accuracy whereas the voice recognition unit 56 is capable of performing no accurate voice recognition due to the effect of noise or the like, response determination may be possible based on the accurate voice recognition result of the first server device 14.

The second output unit 64 outputs a response selected by the response selection unit 58 to the robot 10 via the first communication unit 30.

In a case where no response can be selected based on the voice recognition result of the voice recognition unit 56 and the voice recognition result of the first server device 14, that is, in a case where the voice recognition results do not correspond to the keyword, the first output unit 62 outputs a voice recognition result in which a voice is recognized by the first server device 14 to the second communication unit 32. The second communication unit 32 transmits the voice recognition result to the second server device 16. The above processing corresponds to the first output unit 62 outputting the voice recognition result of the first server device 14 to the second server device 16.

The second server device 16 creates a response with respect to a voice uttered by a user based on the voice recognition result of the first server device 14. For example, the second server device 16 semantically interprets string information by parsing the text data of the voice recognition result. The second server device 16 generates a response based on the result of the string information analysis and outputs the generated response to the information processing device 12. In general, the length of time required for the response creation increases as the data size of voice data increases, that is, the data size of a voice recognition result increases. Known technology can be used for the parsing and the response creation. As described above, the second server device 16 functions as a response generation device. By the second server device 16 being used, a response can be generated, even with respect to a complex voice recognition result, without the configuration of the information processing device 12 becoming complex.

The second communication unit 32 receives a response from the second server device 16. The second acquisition unit 52 acquires the response received by the second communication unit 32. The second acquisition unit 52 outputs the acquired response to the second output unit 64.

With regard to a certain voice, the length of time required for response creation by the second server device 16 exceeds the length of time required for voice recognition by the first server device 14. Accordingly, the length of time from voice recognition result output from the first output unit 62 to the second server device 16 to acquisition of a response from the second server device 16 by the second acquisition unit 52 exceeds the length of time from voice data transmission from the second communication unit 32 to the first server device 14 to acquisition of the voice recognition result of the first server device 14 by the third acquisition unit 54.

Stored in advance in the second storage unit 38 are a plurality of interjections such as "uh-huh", "Yes", "Indeed", and "Hmm". The interjections can also be called bridging utterances.

In a case where a voice recognition result is output to the second server device 16 by the first output unit 62, the interjection selection unit 60 selects an interjection with respect to a voice uttered by a user among the interjections stored in the second storage unit 38. For example, the interjection selection unit 60 selects the interjection at random.

The timing determination unit 66 determines an interjection timing in accordance with the length of time from voice data acquisition completion to start of output of the response generated by the second server device 16 based on a voice recognition result. The length of time required from the voice data acquisition completion to the start of the output of the response is determined based on the data size of the voice data or the data size of the voice recognition result. In a case where a voice recognition result is output to the second server device 16 by the first output unit 62, the timing determination unit 66 determines the timing of an interjection with respect to a voice uttered by a user in accordance with the data size of the voice data or the data size of the voice recognition result. In general, the timing determination unit 66 delays the interjection timing as the data size of voice data or the data size of a voice recognition result increases. Accordingly, in general, the interjection timing is delayed as the length of time that is required for the response creation by the second server device 16 increases.

Here, the timing determination unit 66 determines the interjection timing such that the length of time from interjection output by the second output unit 64 to response output exceeds the length of time from voice data acquisition by the first acquisition unit 50 to interjection output by the second output unit 64.

Specifically, the timing determination unit 66 determines the waiting time from voice recognition result output to the second server device 16 by the first output unit 62 to interjection output by the second output unit 64.

In a case where the data size of the voice data exceeds a first threshold, the timing determination unit 66 determines a first time as the waiting time. The first time is, for example, approximately two seconds.

In a case where the data size of the voice data exceeds a second threshold and is equal to or less than the first threshold, the timing determination unit 66 determines a second time as the waiting time. The second threshold is exceeded by the first threshold. Examples of the second time, which is shorter than the first time, include approximately one second.

In a case where the data size of the voice data is equal to or less than the second threshold, the timing determination unit 66 determines a third time as the waiting time. Examples of the third time, which is shorter than the second time, include approximately 0.5 seconds.

Waiting time determination in accordance with the data size of a voice recognition result can be performed in a similar manner. The first threshold, the second threshold, the first time, the second time, and the third time can be appropriately determined by an experiment, a simulation, and so on. Although an example in which the waiting time is determined from three predetermined times is described here, the waiting time may be determined from two predetermined times or four or more predetermined times as well. Alternatively, the waiting time may be determined from a predetermined equation.

The second output unit 64 outputs the interjection selected by the interjection selection unit 60 to the robot 10 via the first communication unit 30 at the interjection timing determined by the timing determination unit 66, and then outputs the response acquired by the second acquisition unit 52 to the robot 10. In other words, the second output unit 64 outputs an interjection at a timing when the determined waiting time has elapsed since voice recognition result output from the first output unit 62 to the second server device 16 and, after the interjection output, outputs the response upon response acquisition by the second acquisition unit 52.

Figure 2:
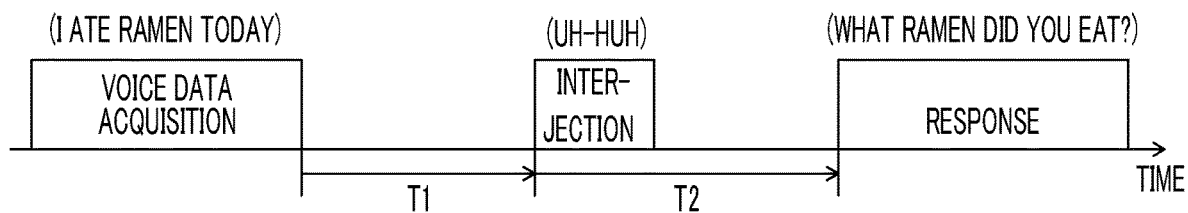
FIG. 2 is a diagram illustrating an example of interjection and response output timings pertaining to the information processing device illustrated in FIG. 1.

FIG. 2 is a diagram illustrating an example of interjection and response output timings pertaining to the information processing device 12 illustrated in FIG. 1. First, the first acquisition unit 50 acquires the voice data of a voice uttered by a user such as "I ate ramen today". The response selection unit 58 is capable of selecting no response with respect to the voice, and thus the second output unit 64 outputs an interjection such as "uh-huh". The second output unit 64 outputs a response created by the second server device 16 such as "What ramen did you eat?". Time T1 from voice data acquisition by the first acquisition unit 50 to interjection output by the second output unit 64 is shorter than time T2 from interjection output by the second output unit 64 to response output by the second output unit 64.

On a hardware basis, the configuration described above can be realized by the central processing unit (CPU), a memory, and other large scale integration (LSI) of any computer. On a software basis, the configuration described above is realized by, for example, a program loaded in a memory. Drawn here is a functional block realized by hardware-software cooperation. Accordingly, it will be understood by those skilled in the art that the functional block can be realized in various forms by hardware alone, by software alone, or by hardware-software combination.

Figure 3:
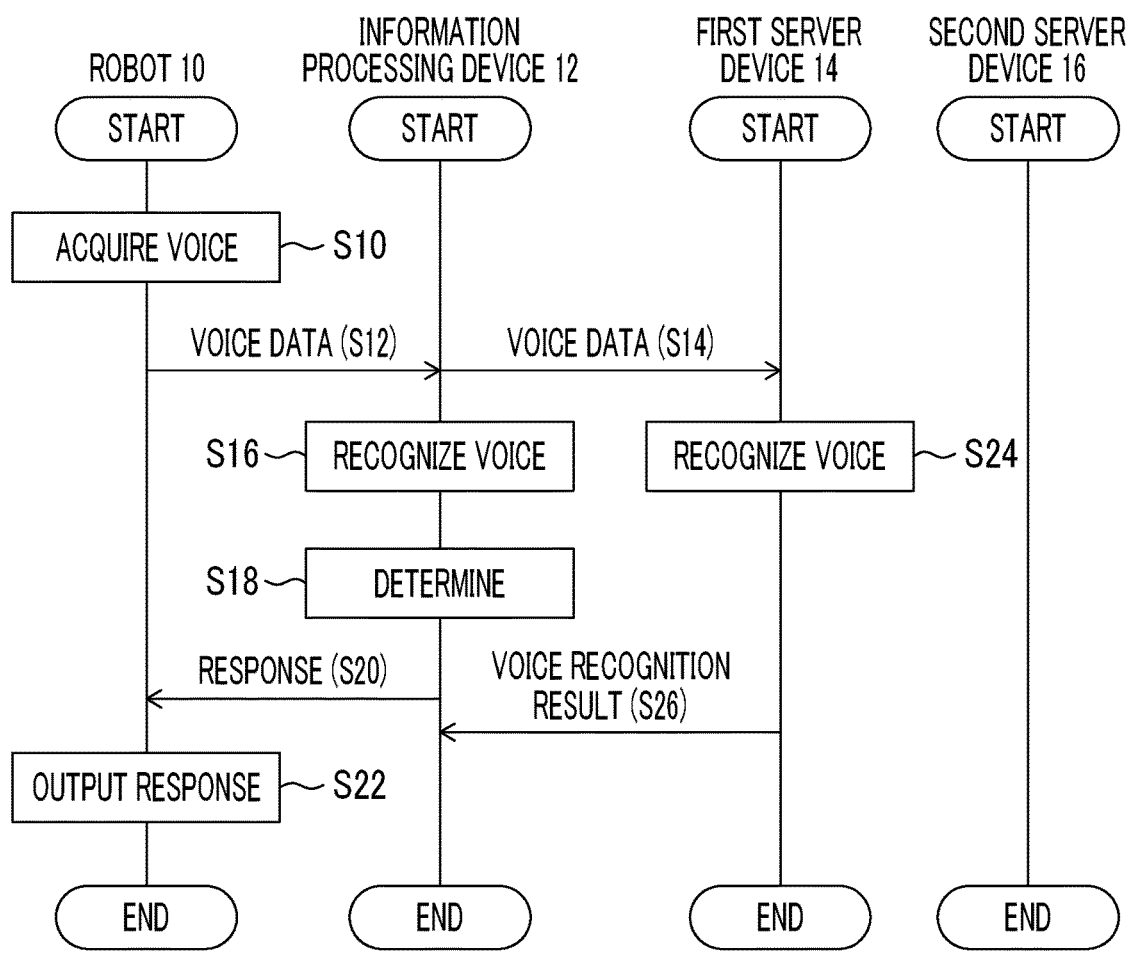
FIG. 3 is a sequence diagram illustrating processing by the information processing system illustrated in FIG. 1.

An overall operation of the information processing system 1 configured as described above will be described below. FIG. 3 is a sequence diagram illustrating processing by the information processing system 1 illustrated in FIG. 1. Illustrated in FIG. 3 is processing in a case where a response can be selected based on the result of voice recognition by the voice recognition unit 56. The above processing is performed every time a voice is acquired by the microphone 20 of the robot 10.

The robot 10 acquires a user's voice (S10) and outputs voice data to the information processing device 12 (S12). The information processing device 12 outputs the received voice data to the first server device 14 (S14). Then, the information processing device 12 recognizes the voice (S16), determines whether or not a response can be selected (S18), and outputs a selected response to the robot 10 (S20). The robot 10 voice-outputs the received response (S22).

With the information processing device 12 performing the processing of Steps S16 and S18, the first server device 14 voice-recognizes the voice data (S24) and outputs the result of the voice recognition to the information processing device 12 (S26). In the example described above, the information processing device 12 does not use the voice recognition result. The second server device 16 performs no processing.

Figure 4:
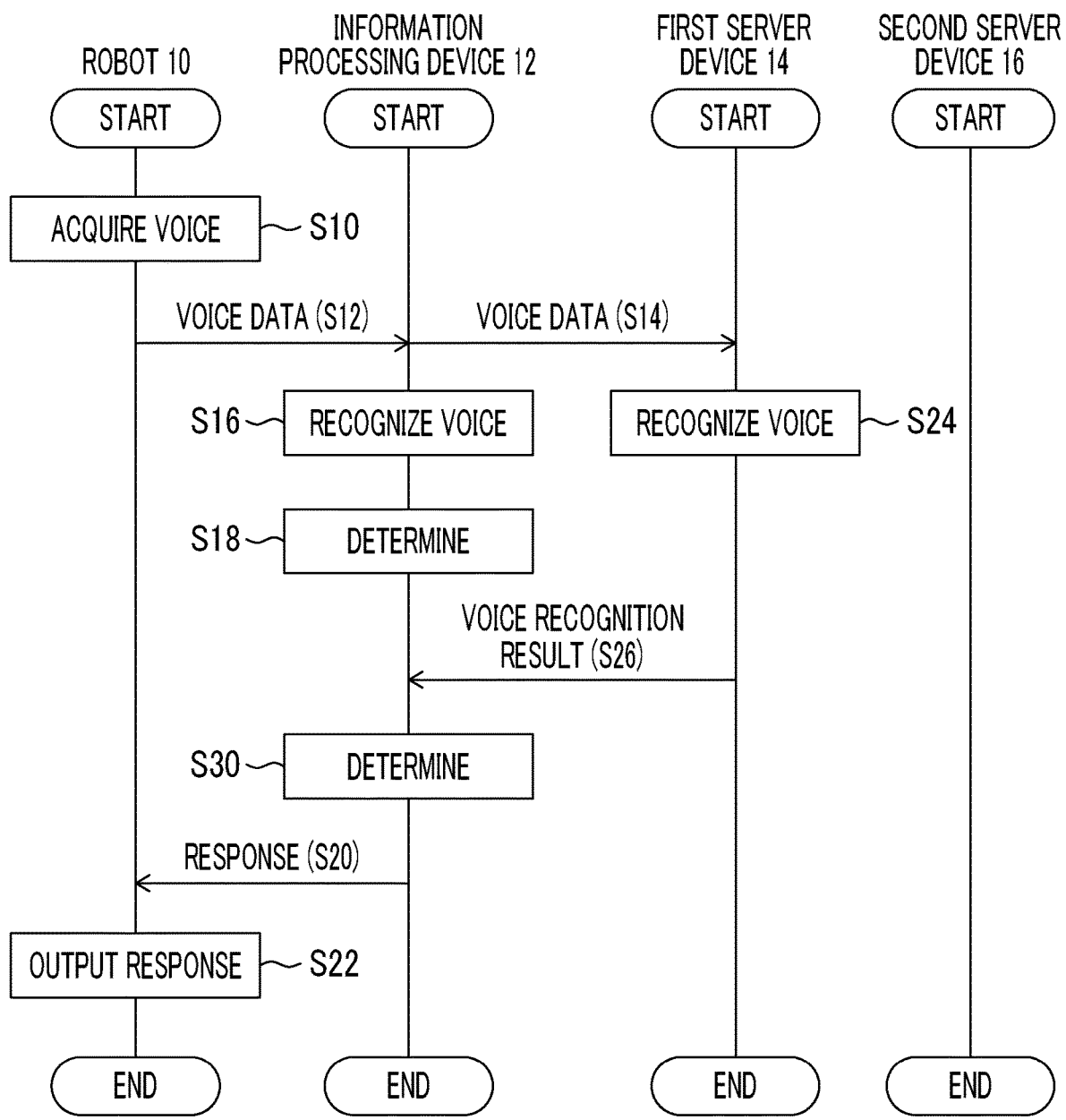
FIG. 4 is a sequence diagram illustrating another processing by the information processing system illustrated in FIG. 1.

FIG. 4 is a sequence diagram illustrating another processing by the information processing system 1 illustrated in FIG. 1. Illustrated in FIG. 4 is processing in a case where no response can be selected based on the result of voice recognition by the voice recognition unit 56 and a response can be selected based on the voice recognition result of the first server device 14. The above processing is performed every time a voice is acquired by the microphone 20 of the robot 10.

The processing of Steps S10 to S26 is identical to that in FIG. 3 with the processing of S30 added. In a case where the information processing device 12 determines that no response can be selected in Step S18, the information processing device 12 determines whether or not a response can be selected based on the voice recognition result of the first server device 14 in Step S26 (S30) and outputs a selected response to the robot 10 (S20).

Figure 5:
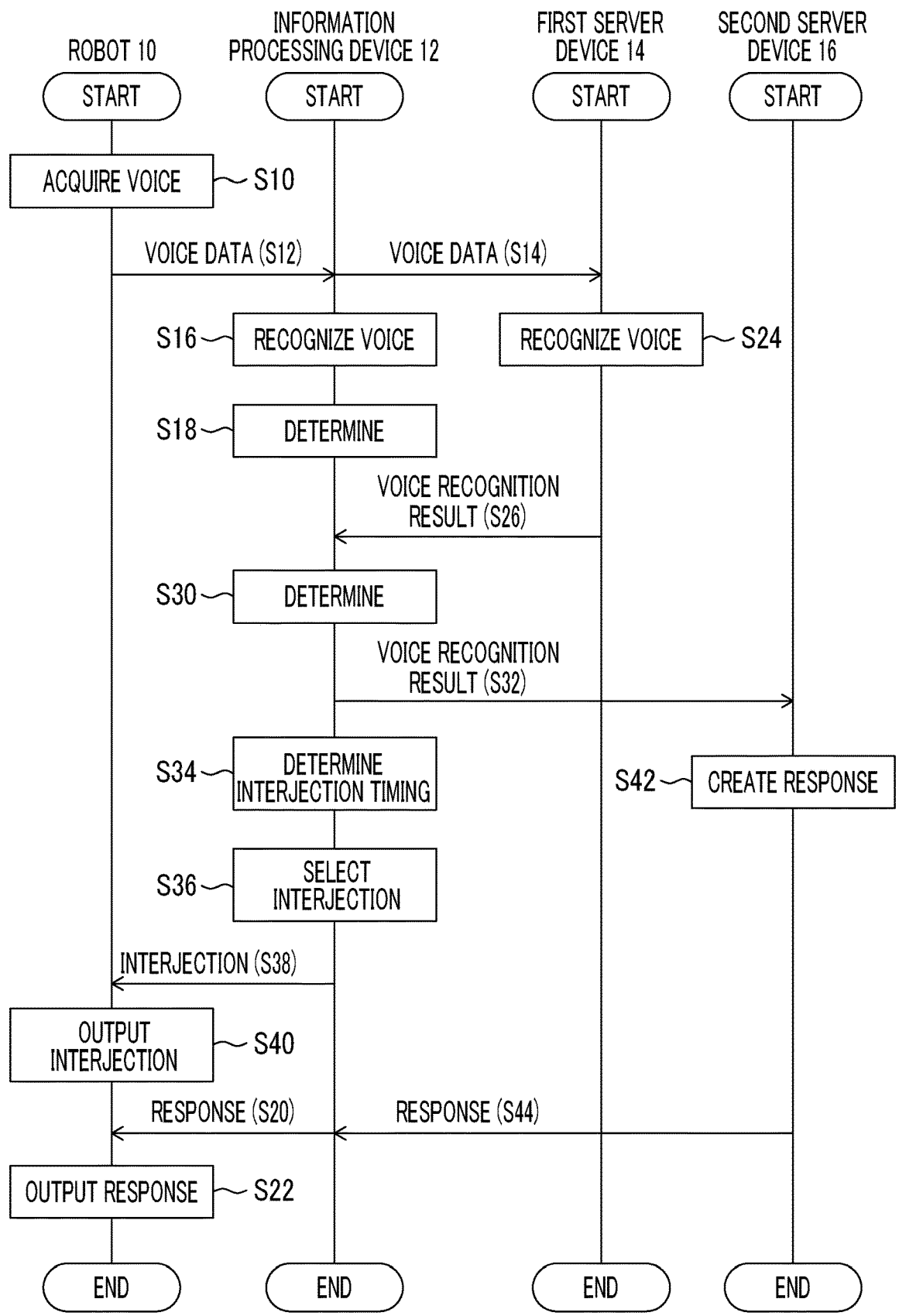
FIG. 5 is a sequence diagram illustrating yet another processing by the information processing system illustrated in FIG. 1.

FIG. 5 is a sequence diagram illustrating yet another processing by the information processing system 1 illustrated in FIG. 1. Illustrated in FIG. 5 is processing in a case where no response can be selected based on the voice recognition result of the voice recognition unit 56 and the voice recognition result of the first server device 14. The above processing is performed every time a voice is acquired by the microphone 20 of the robot 10.

The processing of Steps S10 to S30 is identical to that in FIG. 4 with the processing of Steps S32 to S44 added. In a case where the information processing device 12 determines that no response can be selected in Step S30, the information processing device 12 outputs the voice recognition result of the first server device 14 in Step S26 to the second server device 16 (S32), determines an interjection timing (S34), selects an interjection (S36), and outputs the interjection to the robot 10 at the determined interjection timing (S38). The robot 10 voice-outputs the received interjection (S40). The interjection selection in Step S36 may be performed between Step S30 and Step S32 or between Step S32 and Step S34.

With the information processing device 12 performing the processing of Steps S34, S36, and S38 and the robot 10 performing the processing of Step S40, the second server device 16 creates a response based on the received voice recognition result (S42) and transmits the response to the information processing device 12 (S44). The information processing device 12 outputs the response from the second server device 16 to the robot 10 (S20). The robot 10 voice-outputs the received response (S22).

As described above, according to the embodiment, an interjection is output before a response created by the second server device 16 is output, and thus inter-dialogue connection can become smoother and an uncomfortable dialogue can be suppressed. In addition, since the interjection timing is determined in accordance with the length of time from voice data acquisition completion to start of output of response, the interjection can be delayed and the length of time from the interjection to a response can be shortened in a case where the response processing in the second server device 16 takes time. Accordingly, a user's discomfort attributable to an excessively long interjection-to-response time can be suppressed.

The length of time required from voice data acquisition completion to start of output of response is determined based on the data size of the voice data of a voice uttered by a user or the data size of a voice recognition result, and thus the interjection timing can be easily determined based on the data size.

The interjection timing is determined such that the length of time from interjection output to response output exceeds the length of time from voice data acquisition to interjection output, and thus it is possible to restrain the time from user utterance to interjection hearing from becoming excessively long. Accordingly, user discomfort can be further suppressed.

The disclosure has been described above based on the embodiment. It is to be understood by those skilled in the art that the embodiment is merely an example, various modification examples are possible for each component and combination of processing processes, and such modification examples are also within the scope of the disclosure.

For example, a longer interjection (interjection with a larger data size) may be selected by the interjection selection unit 60 as the data size of the voice data or the data size of the voice recognition result increases. In the above modification example, the interjection termination-to-response time can be further shortened in a case where the response processing in the second server device 16 takes time. Accordingly, user discomfort can be further suppressed.

The robot 10 and the information processing device 12 may be integrated with the robot 10 including the information processing device 12. The information processing device 12 may input and output a voice by using the microphone 20 and the speaker 26, without the robot 10 being used, with the information processing device 12 including the microphone 20 and the speaker 26. The first server device 14 and the second server device 16 may be configured as a single server device. In the above modification example, the configuration of the information processing system 1 can be given a higher degree of freedom.

What is claimed is:

1. An information processing device comprising a processor programmed to:

acquire voice data of a voice uttered by a user, recognize the acquired voice, determine a timing of an interjection in accordance with time from completion of the voice data acquisition to start of output of a response generated based on a result of the voice recognition, output the interjection at the determined timing of the interjection, and output the response at the time of start of the output of the response, wherein the processor determines the timing by increasing a waiting time that precedes a start of the output of the interjection, as a data size of the voice data or a data size of the voice recognition result increases.

2. The information processing device according to claim 1, wherein the processor determines the timing of the interjection such that a time from the completion of the acquisition of the voice data to the start of the output of the interjection is shorter than time from the start of the output of the interjection to a start of the output of the response.

3. The information processing device according to claim 1, wherein the processor selects an interjection with a larger data size as the data size of the voice data or the data size of the voice recognition result increases.

4. The information processing device according to claim 1, further comprising:

a first storage unit that stores a response with respect to one or more keywords defined in advance; and a second storage unit that stores the interjection, wherein the processor selects the response from the first storage unit in a case where the voice recognition result corresponds to one of the keywords.

5. The information processing device according to claim 4, wherein the processor:

transmits the voice recognition result to a server device that creates a response with respect to the voice based on the voice recognition result, and acquires the response from the server device in a case where the voice recognition result does not correspond to the keyword.

6. An information processing device comprising a processor programmed to:

acquire voice data of a voice uttered by a user, recognize the acquired voice, transmit a result of the voice recognition to a server device that creates a response with respect to the voice based on the voice recognition result, acquire the response from the server device, determine a timing of an interjection in accordance with time from completion of the voice data acquisition to start of output of the response in a case where the voice recognition result is transmitted to the server device, and output the response at the time of start of the output of the response after outputting the interjection at the determined timing of the interjection, wherein the processor determines the timing by increasing a waiting time that precedes a start of the output of the interjection, as a data size of the voice data or a data size of the voice recognition result increases.

* * * * *